G. W. FITTS.
Traction-Wheels.
No. 158,206.          Patented Dec. 29, 1874.
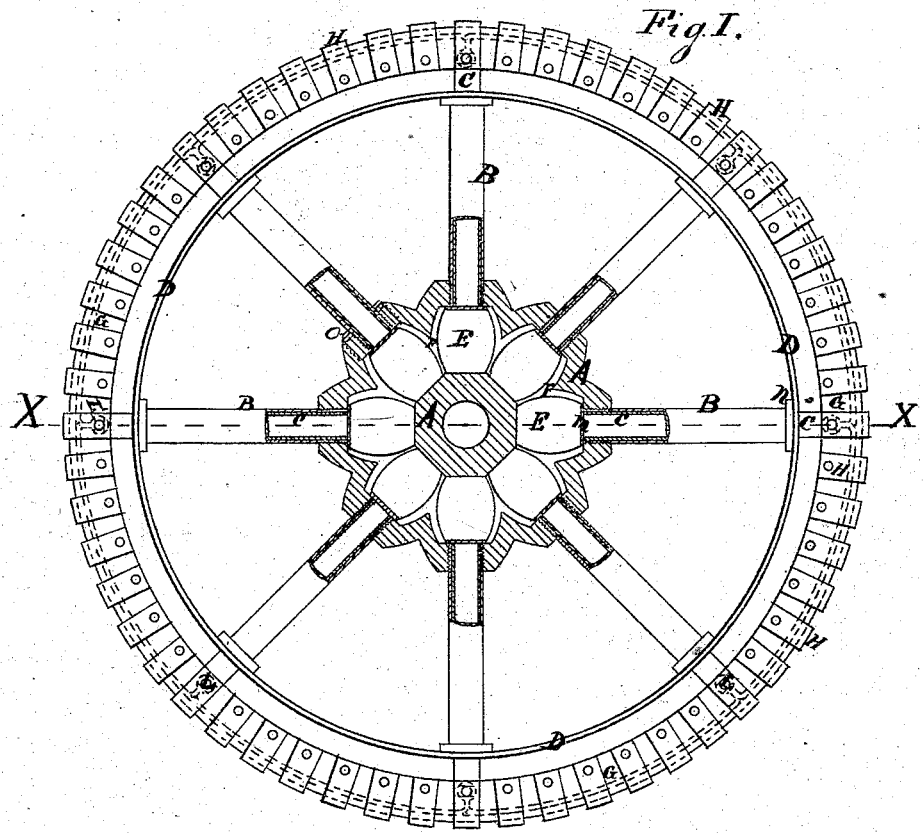
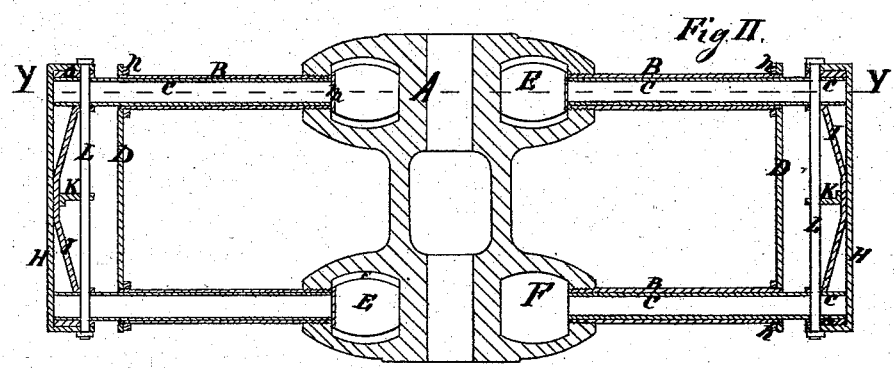
Witnesses.
August Albrecht,
Anna S. Fitts.
Inventor.
George W. Fitts

UNITED STATES PATENT OFFICE.

GEORGE W. FITTS, OF PHILADELPHIA, PENNSYLVANIA.

IMPROVEMENT IN TRACTION-WHEELS.

Specification forming part of Letters Patent No. 158,206, dated December 29, 1874; application filed January 24, 1873.

*To all whom it may concern:*

Be it known that I, GEORGE W. FITTS, of the city of Philadelphia, Commonwealth of Pennsylvania, have invented a new and useful Elastic Wheel for Steam-Vehicles, of which the following is a specification:

The nature of my invention consists in forming the outer rim of a wheel in sections, and uniting these sections with the outer ends of the spokes in such a manner as to form joints at these ends, the inner ends of the same connecting with the hub by means of hollow spokes, through which they pass and fit, and resting upon elastic blocks placed in pockets within the hub of the wheel.

By this combination and arrangement I am enabled to obtain great strength, breadth, lightness, and elasticity—qualities so much desired in a wheel for steam-vehicles.

In order to fully explain my invention the following description and accompanying drawing are referred to as forming a part of my specification of the same.

Figure 1 is a side view of the wheel, with partial section through line $x\,x$, showing the outer rim, the hollow spokes, the hub, the pockets, and elastic blocks within the same. Fig. 2 is a front view, with cross-sections through line $y\,y$.

A represents the hub. This may be of cast-iron or steel, with pockets F, Fig. 2, for the reception of elastic blocks, and the proper openings for the reception of the spokes and axle, as at A and M, Fig. 2. B represents the hollow spokes. They may be formed of any kind of iron tubing or pipe, both ends being threaded, one of which screws into a nipple in the hub directly over the elastic block, as at O, Fig. 1, and the other is fitted into a rim, D, Fig. 1, with a nut, n, Fig. 1, which screws up and down upon the same, keeping the rim in place and the spokes tight. C, Figs. 1 and 2, are the spokes, which connect the outer rim H with the hub and elastic blocks E. These spokes may also be formed of iron tubing or pipe. They pass through, and fit into, the hollow spokes B, the inner ends resting upon the elastic blocks E, as at $m$, Figs. 1 and 2, and the outer ends connect with the outer rim by a bolt, L, that connects them with the side pieces of this rim. D is a thin iron band or rim, which is perforated for the reception of the outer ends of the hollow spokes B, and whose office is to keep them in place. E are the elastic blocks. These may be formed of vulcanized rubber, and of convenient shape to fit the pocket, as at E, Fig. 1. F represents the pockets within the hub. These may be bored out, or may be cored out, in the castings of suitable dimensions and shape to receive the elastic blocks E. G and H represent the outer rim of the wheel. This rim is formed in sections; and may consist of side pieces G and cross-pieces H, with braces I, Fig. 2. Or these sections may be cast in steel or iron, with all these parts together, the sections being united together at the ends, and attached to the outer ends of the spokes C by means of a bolt, L, Fig. 2, which passes through the side pieces G, and spoke C holding them together, and permitting the sections of the rim to hinge upon this bolt, and move back and forth upon the same in a slot, L', Fig. 1, cut in the side pieces G for this purpose, thus permitting the outer rim to adjust itself to the spring of the elastic block within the hub, upon which the inner ends of the spokes C rest.

Having thus described my invention, what I claim, and desire to secure by Letters Patent, is—

1. The combination of the outer rim of a wheel formed in jointed and united sections, the hollow spokes C and B, elastic blocks E, and hub A, substantially as and for the purpose set forth.

2. The hub of a wheel formed with pockets for the reception of elastic blocks, substantially for the purpose described.

3. Elastic blocks placed in pockets in the hub of a wheel, combined as and for the purpose set forth.

GEORGE W. FITTS.

Witnesses:
 ANNA S. FITTS,
 GEO. W. REED.